US009262838B2

(12) United States Patent
Liu et al.

(10) Patent No.: US 9,262,838 B2
(45) Date of Patent: Feb. 16, 2016

(54) METHOD AND APPARATUS FOR DETECTING TRAFFIC VIDEO INFORMATION

(71) Applicants: PEKING UNIVERSITY FOUNDER GROUP CO., LTD., Beijing (CN); PEKING UNIVERSITY, Beijing (CN); BEIJING FOUNDER APABI TECHNOLOGY LTD., Beijing (CN)

(72) Inventors: Yan Liu, Beijing (CN); Xiaoqing Lv, Beijing (CN); Jianbo Xu, Beijing (CN); Zhi Tang, Beijing (CN)

(73) Assignees: PEKING UNIVERSITY FOUNDER GROUP CO., LTD., Beijing (CN); BEIJING FOUNDER APABI TECHNOLOGY LTD., Beijing (CN); PEKING UNIVERSITY, Beijing (CN)

( * ) Notice: Subject to any disclaimer, the term of this patent is extended or adjusted under 35 U.S.C. 154(b) by 112 days.

(21) Appl. No.: 14/092,663

(22) Filed: Nov. 27, 2013

(65) Prior Publication Data

US 2014/0348378 A1 Nov. 27, 2014

(30) Foreign Application Priority Data

May 21, 2013 (CN) .......................... 2013 1 0190256

(51) Int. Cl.
*G06K 9/00* (2006.01)
*G06T 7/20* (2006.01)
(52) U.S. Cl.
CPC ..... *G06T 7/2006* (2013.01); *G06T 2207/10016* (2013.01); *G06T 2207/10024* (2013.01); *G06T 2207/30236* (2013.01)

(58) Field of Classification Search
None
See application file for complete search history.

(56) References Cited

U.S. PATENT DOCUMENTS

| 6,195,458 | B1 * | 2/2001 | Warnick et al. | 382/173 |
|---|---|---|---|---|
| 7,680,328 | B2 * | 3/2010 | Noh | 382/168 |
| 2002/0015105 | A1 * | 2/2002 | Abe et al. | 348/460 |
| 2007/0201746 | A1 * | 8/2007 | Kim | 382/190 |
| 2007/0273931 | A1 * | 11/2007 | Shingai | 358/3.27 |
| 2014/0078395 | A1 * | 3/2014 | Dhillon | 348/500 |

OTHER PUBLICATIONS

Wu et al., "FDU at TREC2002: filtering, Q&A, web and video tasks", 2002.*
Koprinska et al., "Temporal video segmentation: a survey", Signal Processing: Image communication 16 (2001) 477-500.*

* cited by examiner

*Primary Examiner* — Soo Park
(74) *Attorney, Agent, or Firm* — Workman Nydegger

(57) ABSTRACT

The present invention provides a method and an apparatus for detecting traffic video information. The method includes: acquiring a traffic video stream; determining color features of each frame of image in the traffic video stream; calculating the inter-frame distance between adjacent frames according to the color features; calculating the boundary of an image clustered frames' group according to the inter-frame distance by adopting an image clustering evaluation standard in RGB space and an image clustering evaluation standard in YUV space respectively; and determining a final boundary of the image clustered frames' group according to the boundaries of the image clustered frames' group in RGB space and YUV space. By using the present invention, the stability of detection results in different environments may be improved.

9 Claims, 3 Drawing Sheets

METHOD AND APPARATUS FOR DETECTING TRAFFIC VIDEO INFORMATION

This application claims the benefit of Chinese Patent Application No. 201310190256.9, filed on May 21, 2013, which is incorporated herein by reference.

FIELD OF THE INVENTION

The present invention relates to the technical field of video processing, in particular to a method and an apparatus for detecting traffic video information.

BACKGROUND OF THE INVENTION

In order to realize automation and intelligentization of acquisition of road traffic information, a video vehicle detection method based on image processing technology is adopted at present to identify traffic streams from a traffic monitoring video.

At present, many established video traffic information acquisition products (including video information acquisition systems installed on road surfaces in cities of Beijing and the like) have come out, but the detection precision of these products in all-weather complex environments fluctuates largely, and especially when car lights are projected on the road surfaces or halation occurs at night, and in severe weather conditions of rain, dust, haze and the like, the detection results thereof cannot meet the stability requirement of detection.

SUMMARY OF THE INVENTION

Embodiments of the present invention provide a method and an apparatus for detecting traffic video information, to improve the stability of detection results in different environments.

For this purpose, the embodiments of the present invention provide the following solution:
a method for detecting traffic video information, including:
acquiring a traffic video stream;
determining color features of each frame of image in the traffic video stream;
calculating the inter-frame distance between adjacent frames according to the color features;
calculating the boundary of an image clustered frames' group according to the inter-frame distance by adopting an image clustering evaluation standard in RGB color space and an image clustering evaluation standard in YUV color space respectively; and
determining a final boundary of the image clustered frames' group according to the boundaries of the image clustered frames' group in RGB color space and YUV color space.

Preferably, the acquiring the traffic video stream includes:
acquiring the traffic video stream through continuous shooting.

Preferably, the determining the color features of each frame of image in the traffic video stream includes:
sampling each frame of image to obtain sampled data;
generating histograms of R, G, B and Y channels of each frame of image according to the sampled data; and
expressing the color features of each frame of image using four-dimensional histograms as $F=\{H_R^i, H_G^i, H_B^i, H_Y^i\}$, wherein $H_R^i, H_G^i, H_B^i, H_Y^i$ are histograms of four color channels of R, G, B and Y respectively, i=1, 2, ..., N and N is the number of bins of each divided color channel.

Preferably, the method also includes: before generating the histograms of the R, G, B and Y color channels of each frame of image according to the sampled data, de-noising the sampled data.

Preferably, the calculating the inter-frame distance between the adjacent frames according to the color features includes:
calculating the inter-frame distance of each color channel between the adjacent frames in RGB space respectively;
finding an intersection of the inter-frame distances corresponding to the three color channels of R, G and B;
determining the minimal and maximal inter-frame distances of the three color channels of R, G and B respectively to obtain the inter-frame distance in RGB space; and
calculating the inter-frame distance of a Y color channel between the adjacent frames in YUV space to obtain the inter-frame distance in YUV space.

Preferably, the calculating the boundary of the image clustered frames' group according to the inter-frame distance by adopting the image clustering evaluation standard in RGB space includes:
determining the boundary of the image clustered frames' group in RGB space by using the inter-frame distance in RGB space and a preset first target function.

Preferably, the calculating the boundary of the image clustered frames' group according to the inter-frame distance by adopting the image clustering evaluation standard in YUV space includes:
determining the boundary of the image clustered frames' group in YUV space by using the inter-frame distance in YUV space and a preset second target function.

Preferably, the determining the final boundary of the image clustered frames' group according to the boundaries of the image clustered frames' group in RGB space and YUV space includes:
finding an intersection of the boundary of the image clustered frames' group in RGB space and the boundary of the image clustered frames' group in YUV space to obtain the final boundary of the image clustered frames' group.

An apparatus for detecting traffic video information, including:
a video image acquiring module, configured to acquire a traffic video stream;
a color feature determining module, configured to determine color features of each frame of image in the traffic video stream;
a distance calculating module, configured to calculate the inter-frame distance between adjacent frames according to the color features;
a boundary calculating module, configured to calculate the boundary of an image clustered frames' group according to the inter-frame distance by adopting an image clustering evaluation standard in RGB space and an image clustering evaluation standard in YUV space respectively; and
a boundary determining module, configured to determine a final boundary of the image clustered frames' group according to the boundaries of the image clustered frames' group in RGB space and YUV space.

Preferably, the color feature determining module includes:
a sampling unit, configured to sample each frame of image to obtain sampled data;

a histogram generating unit, configured to generate histograms of R, G, B and Y color channels of each frame of image according to the sampled data; and a color feature expressing unit, configured to express the color features of each frame of image using four-dimensional histograms as $F=\{H_R^i, H_G^i, H_B^i, H_Y^i\}$, wherein $H_R^i, H_G^i, H_B^i, H_Y^i$ are histograms of four channels of R, G, B and Y respectively, i=1, 2, ..., N and N is the number of bins of each divided color channel.

Preferably, the color feature determining module also includes:

a de-noising unit, configured to de-noise the sampled data before the histograms of the R, G, B and Y color channels of each frame of image are generated according to the sampled data.

Preferably, the distance calculating module includes:

a first calculating unit, configured to calculate the inter-frame distance of each color channel between the adjacent frames in RGB space;

an intersection unit, configured to find an intersection of the inter-frame distances corresponding to the three color channels of R, G and B;

RGB space distance determining unit, configured to determine the minimal and maximal inter-frame distances of the three color channels of R, G and B respectively to obtain the inter-frame distance in RGB space; and YUV space distance determining unit, configured to calculate the inter-frame distance of a Y color channel between the adjacent frames in YUV space to obtain the inter-frame distance in YUV space.

Preferably, the boundary determining module is specifically configured to find an intersection of the boundary of the image clustered frames' group in RGB space and the boundary of the image clustered frames' group in YUV space to obtain the final boundary of the image clustered frames' group.

According to the method and the apparatus for detecting the traffic video information provided in the embodiments of the present invention, image color and brightness information are fully utilized, the relationship between image frames on the time sequence is considered, and clustering of each group of images reflects the movement process of a vehicle; and the method and the apparatus according to the embodiments of the present invention have strong adaptability to environment changes, and can still achieve stable detection with relatively high precision in severe weathers such as rain, snow and haze.

DETAILED DESCRIPTION OF THE EMBODIMENTS

The present invention will be described in detail below with reference to accompanying drawings and in conjunction with embodiments.

In view of the problems in the prior art that vehicle video detection is affected by an external environment and cannot meet the stability requirement of detection, embodiments of the present invention provide a method and an apparatus for detecting traffic video information. A five-dimensional image feature expression (R, G, B, Y and t) is constructed by using the relationship of parallelism between a video frame stream and a time axis t, in conjunction with a three-channel (R, G and B) color feature expression of a two-dimensional image, wherein Y is luminance component (the brightness information) of the image, each five-dimensional image feature is regarded as a node, similarity among nodes is measured by using a histogram intersection method, then an evaluation index Score(t) is obtained according to the MN-MAX segmentation theory, clustering boundary evaluation is performed on continuous frames of images, the evaluation index Score(t) satisfies the condition that the inter-frame similarity inside clustered frame image group is higher and the inter-frame similarity between clustered frame image groups is lower, each clustered frame image group reflects the movement process of a vehicle, and the number of frames in the group is in direct proportion to the average movement speed of the vehicle.

Figure 1:
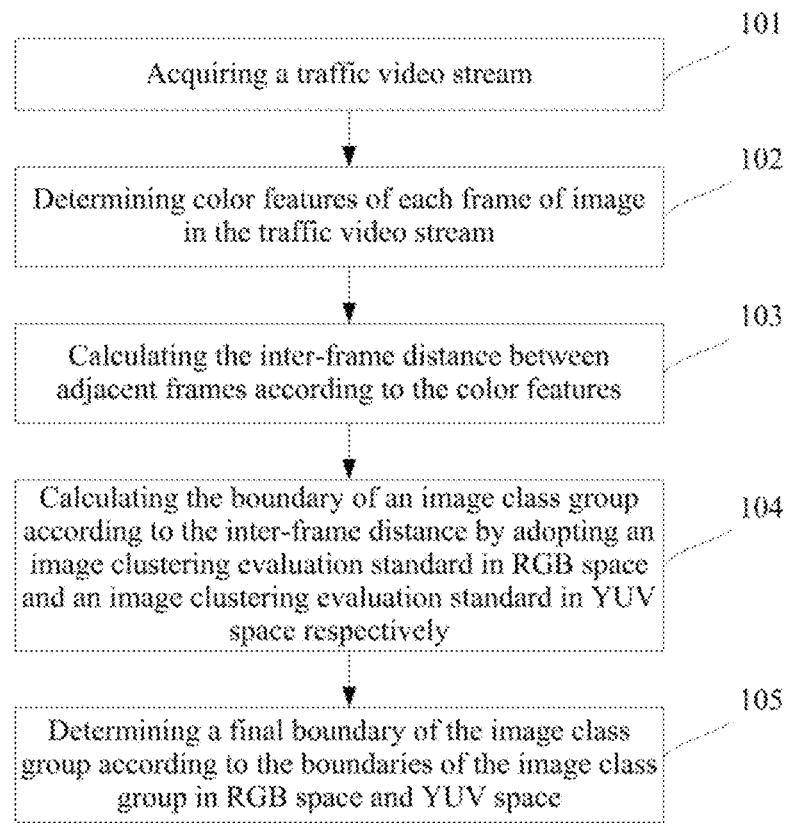
FIG. 1 is a flowchart of a method for detecting traffic video information in an embodiment of the present invention.

FIG. 1 shows a flow of a method for detecting traffic video information in an embodiment of the present invention. This flow includes the following steps:

step 101: acquiring a traffic video stream.

Specifically, the traffic video stream may be acquired by using a video camera.

step 102: determining color features of each frame of image in the traffic video stream.

That is to say, visual contents of the image are quantified.

Specifically, in RGB space, histograms of three color channels of R, G and B are calculated for each frame in traffic monitoring video respectively, and each histogram channel is divided into 16 bins. In order to improve algorithm detection precision and increase vehicle target proportion, a de-noising threshold $T=\sqrt{H*W}$ is set, wherein H and W represent the height and the width of an ROI ((Region of Interest) respectively. The bins exceeding T are not considered, and the color features of the visual contents of the image are expressed with histograms as:

$$F=\{H_R^i, H_G^i, H_B^i, H_Y^i\} \quad (1),$$

wherein $H_R^i, H_G^i, H_B^i, H_Y^i$ are histogram expressions of four channels of R, G, B and Y respectively, i=1, 2, ..., N and N is the number of bins of each divided color channel.

step 103: calculating the inter-frame distance between adjacent frames according to the color features.

Inter-frame similarity is evaluated by the length of distance. In order to visually reflect the distance between the adjacent frames, feature signals of the four-dimensional histogram expressed by above-mentioned formula (1) may be converted into a continuous one-dimensional time signal, and the one-dimensional time signal is obtained from the distance between the adjacent frames of four color channels.

Figure 2:
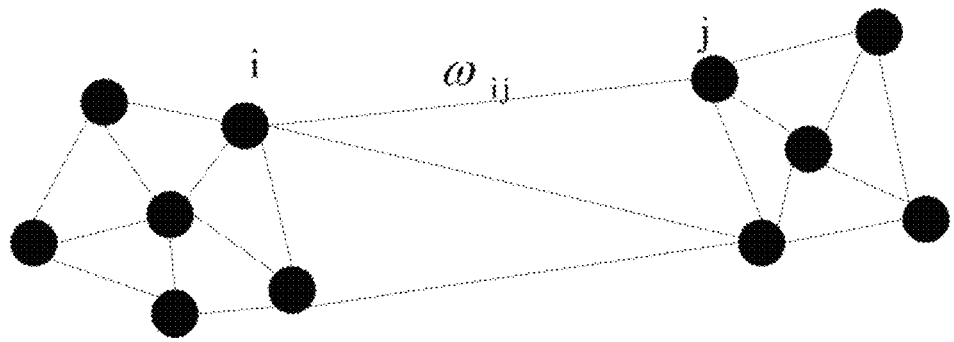
FIG. 2 is a schematic diagram of division of a G space including 11 nodes in an embodiment of the present invention.
Figure 3:
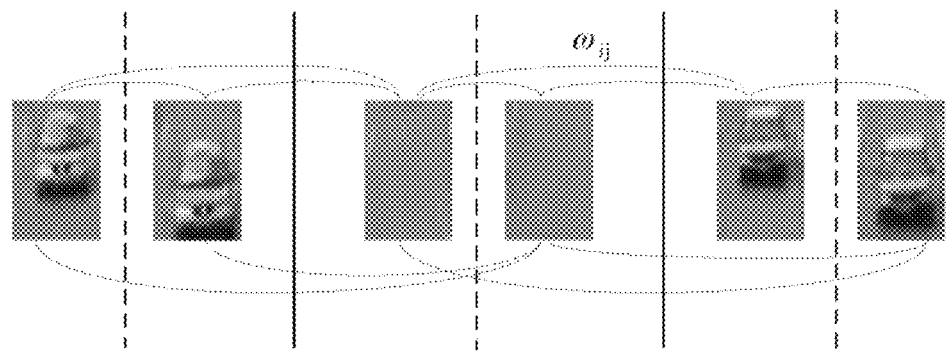
FIG. 3 is a schematic diagram of comparison of inter-frame distances and inter-class division of a sequence in an embodiment of the present invention.

Suppose there is a two-dimensional image space G=G(E, V), namely a model of Graph-cut, and this space includes a node set V, an inter-node chord set E and a similarity measure matrix W. $\omega_{ij} \in [0,1]$, ($\omega_{ij} \in$ W) represents the weight of a chord e(i, j) ∈ E, namely the distance between nodes i, j (i, j ∈ V), as shown in FIGS. 2 and 3. The distance between the adjacent frames is measured by a histogram intersection, namely $\omega_{ij}$.

$$\omega_{ij} = \sum_k \min(H_k^i, H_k^j) \times \begin{cases} e^{\frac{-\|i-j\|_2^2}{\sigma^2}}, & \text{if } |i-j| < d \\ 0, & \text{else} \end{cases} \quad (2)$$

Herein, $\omega_{ij}$ only represents the measure of any of the three channels of R, G and B. In addition, in (2), $H_k^i$ represents the histogram of the $i^{th}$ frame of image, k is the number of bins, $\sigma$ is a parameter related to the distance, d is the maximal distance between the current frame and the adjacent frame, and the intersection of histograms of the three colors channels is expressed as:

$$\min(H_k^i, H_k^j) = \{\min(H_{k,B}^i, H_{k,B}^j), \min(H_{k,G}^i, H_{k,G}^j), \min(H_{k,R}^i, H_{k,R}^j)\} \quad (3),$$

wherein $H_{k,B}^i, H_{k,G}^i, H_{k,R}^i$ represent values of the $k^{th}$ bins of the histograms corresponding to the B, G and R channels of the $i^{th}$ frame of image respectively, the shortest distance $\omega_{ij}$ among the three color channels is taken as the inter-frame distance, and the distance measure index of two frames of images may be expressed as:

$$\omega_{ij} = \min(\omega_{ij,R}, \omega_{ij,G}, \omega_{ij,B}) \quad (4),$$

$$\rho_{ij} = \min(\omega_{ij,R}, \omega_{ij,G}, \omega_{ij,B}) \quad (5),$$

wherein $\omega_{ij,R}, \omega_{ij,G}, \omega_{ij,B}$ are distances between two frames (i, j) of images corresponding to the three color channels respectively.

The luminance component is expressed as:

$$Y = 0.229R + 0.587G + 0.114B \quad (6),$$

the inter-frame distance of the Y channel is:

$$H_k = \begin{cases} |H_k^i - H_k^j| & \text{if } |H_k^i - H_k^j| > 0 \\ 0 & \text{else} \end{cases} \quad (7)$$

$$M_k = \begin{cases} H_k^j & \text{if}(H_k^j - H_k^i) > Thres \\ H_k^i & \text{if}(H_k^i - H_k^j) > Thres, \\ |H_k^i - H_k^j| & \text{else} \end{cases}$$

wherein Thres is a threshold, and $M_k$ is a histogram of the component Y.

step 104: calculating the boundary of an image clustered frames' group according to the inter-frame distance by adopting an image clustering evaluation standard in RGB space and an image clustering evaluation standard in YUV space respectively.

Specifically, frames with short distances may be clustered in a group, and this clustering is realized by using score(t).

The image clustering evaluation standard in RGB space represents the degree of difference of colors between different frames and has low capability of describing brightness, and thus is not suitable for videos with a particularly low color resolution; and the image clustering evaluation standard in YUV space represents the degree of difference of brightness between different frames and has low requirement on the image resolution, and thus can better describe the change of brightness between frames.

In the embodiment of the present invention, in order to enhance the robustness, the two above-mentioned image clustering evaluation standards are combined.

Suppose G(E,V) is an image space required to be divided, each inner image is an inner node of G, and the G is divided into two subspaces A and B by calculating the distance between the nodes. Herein, defined are:

$$\text{cut}(A,B) = W(A,B) = \Sigma_{i \in A, j \in B} \omega_{ij} \quad (8),$$

$$\text{assoc}(A) = W(A) = W(A,A) = \Sigma_{i,j \in A} \omega_{ij} \quad (9),$$

$$\text{assoc}(A,G) = W(A,G) = \Sigma_{i \in A, j \in G} \omega_{ij} \quad (10),$$

$$\text{assoc}(A,B) = \Sigma_{i \in A, j \in B} \rho_{ij} \quad (11),$$

wherein cut(A, B) represents the sum of lengths of all chords for connecting the nodes between A and B in G, and reflects the intensity of node connection between A and B; assoc(A)=W(A,A) represents the sum of lengths of all chords in A, similarly, assoc(A,G) represents the sum of lengths of chords between all nodes in A and G and reflects the proportional intensity of A in G, and assoc(A, B) represents the sum of lengths of chords between nodes of A and B groups. In order to ensure that the connection intensity between the nodes in the same subspace has a maximum and the connection intensity between the nodes in different subspaces has a minimum, the following clustering boundary division expression is obtained by using the MIN-MAX theory: the evaluation index in RGB space is:

$$\text{Score}_{rgb}(t) = \quad (12)$$
$$\min\left\{\frac{\text{cut}(A, B)}{\text{assoc}(A, G)} + \frac{\text{cut}(A, B)}{\text{assoc}(B, G)}, \frac{\text{cut}(A, B)}{\text{assoc}(A, B)}, \frac{\text{cut}(A, B)}{S_{ROI}}\right\},$$

wherein min represents minimum operation, and $S_{ROI}$ represents the area of an ROI.

The evaluation index in YUV space is:

$$\text{Score}_{Yuv}(t) = M_{cut}(\{t-d+1, \ldots, t\}, \{t+1, \ldots, t+d\}) \quad (13),$$

wherein d=1 or d>1, and d represents the size of subspaces A and B, namely the number of image frames in the space; when d=1, the distance between two frames of images in the space G is measured; and when d>1, information of all image frames in the radius range of d is required to be considered when the similarity of the current frame is calculated.

step 105: determining a final boundary of the image clustered frames' group according to the boundaries of the image clustered frames' group in RGB space and YUV space.

The above-mentioned formulas (12) and (13) express the boundary of the image clustered frames' group in RGB space and the boundary of the image clustered frames' group in YUV space respectively.

In the embodiment of the present invention, an intersection of the boundary of the image clustered frames' group in RGB space and the boundary of the image clustered frames' group in YUV space may be found, and this intersection is used as the final boundary of the image clustered frames' group.

Specifically, in order to enable images in a group to be evaluated as close and images between groups to be evaluated as far, a final clustered image grouping evaluation index is obtained as follows:

$$\text{Score}(t) = \min\{\text{Score}_{rgb}(t), \text{Score}_{YUV}(t)\} \quad (14).$$

According to the target function determined in formula (14), a one-dimensional time signal may be obtained on the time dimension, and the valley bottom of this signal corresponds to a frame with greater image difference and is defined as the boundary of the image clustered frames' group.

Figure 4:
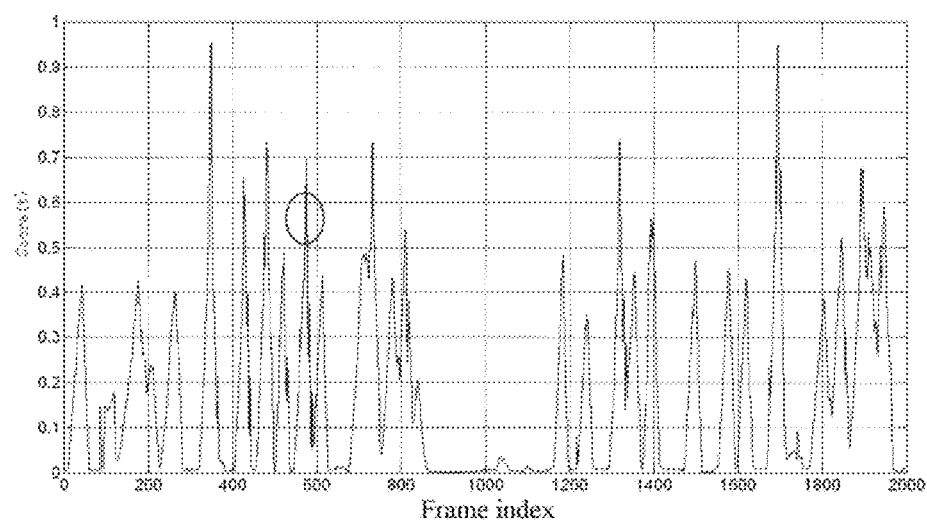
FIG. 4 is a schematic diagram of an image clustering effect in an embodiment of the present invention.

FIG. 4 shows a schematic diagram of an effect of image clustering in an embodiment of the present invention, wherein each single peak corresponds to a clustered frames' group; the further the clustered groups are, the bigger the difference between neighboring groups is; and the closer the clustered groups are, the smaller the difference between the neighboring groups is.

Thus it can be seen in the method for detecting the traffic video information in the embodiment of the present invention, image color and brightness information is fully utilized, and the relationship between image frames in the time sequence is considered, and each image clustered group reflects the movement process of a vehicle.

This method has strong adaptability to environment changes, and can still achieve stable detection with relatively high precision in severe weathers such as rain, snow and haze.

This method does not emphasize symmetry of a vehicle body, and has low requirements on installation position and angle of a video camera and also has strong adaptability to the condition of slow movement in jam.

The process for detecting the traffic video information by using the method according to the embodiment of the present invention is continued to be described in detail below.

Firstly, a video camera is needed to be calibrated roughly, the most ideal installation position of the video camera is a high gantry which crosses a road and has the height of five to six meters, and the orientation of the video camera is parallel to the direction of a lane. However, strict requirement is not made in the method according to the embodiment of the present invention, and a lowest working requirement is given herein: it is ok as long as the video camera may cover the lane required to be detected, and the view of the camera can at least cover a complete vehicle body.

Then, a video stream is acquired by using the video camera, signals are processed through equipment such as a video coder, an optical transceiver and a network video server, and then image frames are sampled from the video stream.

For the sampled images, histograms of R, G, B and Y color channels of each frame of image are calculated, and suppose d=10 herein, namely previous 20 frames of images are used for algorithm initialization. The chord distance between the images in the adjacent d range is calculated for the histograms of three color channels of R, G and B respectively, and the minimal one of the calculation results of the three channels is taken. The histogram of the image brightness Y channel is directly measured by adopting the inter-frame distance measurement method expressed in formula (2).

After the chord distance between the images is calculated, the boundary of the image clustered frames' group is calculated by adopting the image clustering evaluation standard in RGB space and the image clustering evaluation standard in YUV space respectively.

In consideration of normalization of image data, the intersection of the histograms of the channels of an image should still be smaller than the area of an image detection area, so a limiting condition of area may be added in $Score_{rgb}(t)$.

Finally, after image clustering evaluations in the RGB and YUV spaces are acquired respectively, a position accepted by both of them is taken as the inter-class boundary of the images by using an intersection method. In order to solve the problem that the algorithm robustness becomes weak due to threshold selection, a peak-valley detection method may be adopted for judging whether the current position is at the boundary of a group or not, the part with a peak between two groups' boundaries corresponds to the movement process of a vehicle, and the Score(t) value in the absence of vehicles is close to zero.

In order to overcome pseudo peaks in the detection results, as marked by a circle in FIG. 4, each single peak corresponds to a clustered group; the further the clustered groups are spaced apart from each other, the bigger the difference between neighboring groups is; and the closer the clustering groups are spaced apart from each other, the smaller the difference between the neighboring groups is.

Based on the above-mentioned condition, a smooth threshold S may be set; if the average speed of a measured object is limited to be less than or equal to 200 km/h, S may be selected between 20 and 40; if the average speed of the measured object is limited to be less than or equal to 400 km/h, the S may be selected between 10 and 25; in this way, detection errors caused by the pseudo peaks may be avoided.

Through several above-mentioned steps, video detection of a vehicle is realized. Since in the method according to the embodiment of the present invention, not only is the color information considered, but also the brightness information is considered, the method has good adaptability to the problem of targets adhesion caused by traffic jam or car light projection at night in a vehicle detection method based on a gray level image in the prior art. Moreover, by using the method according to the embodiment of the present invention, the video processing speed of a PC may reach 60 frames per second, and the video processing speed of a TMS320DM642 is about 20 frames per second, so the method may meet the requirement on real-time processing.

It can be seen from the above description that in the method according to the embodiment of the present invention, image color and brightness information is fully utilized, and the relationship between image frames in the time sequence is considered, and each image clustered group reflects the movement process of a vehicle.

This method has strong adaptability to environment changes, and can still achieve stable detection with relatively high precision in severe weathers such as rain, snow and haze.

This method does not emphasize symmetry of a vehicle body, and has low requirements on installation position and angle of a video camera and also has strong adaptability to the condition of slow movement in jam.

Figure 5:
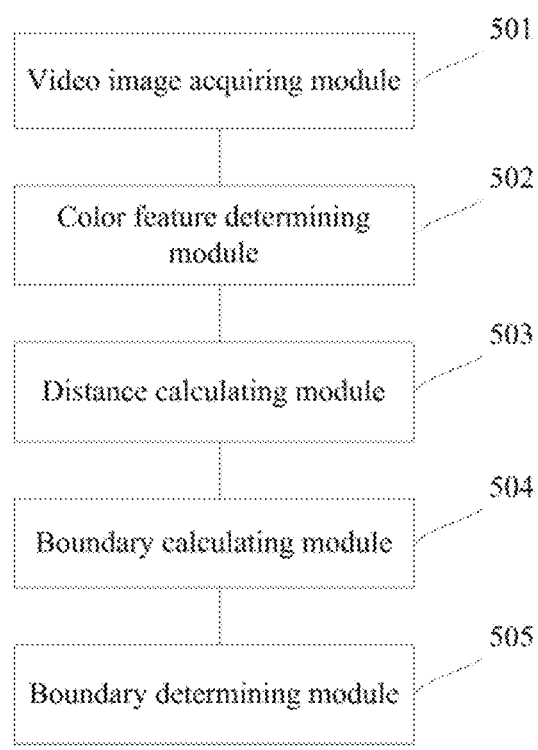
FIG. 5 is a structural schematic diagram of an apparatus for detecting traffic video information in an embodiment of the present invention.

Correspondingly, an embodiments of the present invention also provide an apparatus for detecting traffic video information. FIG. 5 shows a structural schematic diagram of the apparatus.

In this embodiment, the apparatus includes:
a video image acquiring module 501, configured to acquire a traffic video stream;
a color feature determining module 502, configured to determine color features of each frame of image in the traffic video stream;
a distance calculating module 503, configured to calculate the inter-frame distance between adjacent frames according to the color features;
a boundary calculating module 504, configured to calculate the boundary of an image clustered frames' group according to the inter-frame distance by adopting an image clustering evaluation standard in RGB space and an image clustering evaluation standard in YUV space respectively; and
a boundary determining module 505, configured to determine a final boundary of the image clustered frames' group according to the boundaries of the image clustered frames' group in RGB space and YUV space.

An embodiment of the above-mentioned color feature determining module 502 includes:
a sampling unit, configured to sample each frame of image to obtain sampled data;

a histogram generating unit, configured to generate histograms of R, G, B and Y color channels of each frame of image according to the sampled data; and a color feature expressing unit, configured to express the color features of each frame of image using four-dimensional histograms as $F=\{H_R^i, H_G^i, H_B^i, H_Y^i\}$, wherein $H_R^i, H_G^i, H_B^i, H_Y^i$ are histograms of four channels of R, G, B and Y respectively, i=1, 2, . . . , N and N is the number of bins of each divided color channel.

In order to reduce noise, the above-mentioned color feature determining module 502 may further include:

a de-noising unit, configured to de-noise the sampled data before the histograms of the R, G, B and Y color channels of each frame of image are generated according to the sampled data.

The above-mentioned distance calculating module 503 includes:

a first calculating unit, configured to calculate the inter-frame distance of each color channel between the adjacent frames in RGB space;

an intersection unit, configured to find an intersection of the inter-frame distances corresponding to the three color channels of R, G and B;

RGB space distance determining unit, configured to determine the minimal and maximal inter-frame distances of the three color channels of R, G and B respectively to obtain the inter-frame distance in RGB space; and YUV space distance determining unit, configured to calculate the inter-frame distance of a Y color channel between the adjacent frames in YUV space to obtain the inter-frame distance in YUV space.

The above-mentioned boundary determining module 505 is specifically configured to find an intersection of the boundary of the image clustered frames' group in RGB space and the boundary of the image clustered frames' group in YUV space to obtain the final boundary of the image clustered frames' group.

It shall be noted that, for the way of realizing the function of each above-mentioned module, please refer to the previous description of the method for detecting the traffic video information in the embodiment of the present invention shown in FIG. 1, and repeated description is not given herein.

It is thus clear that in the apparatus for detecting the traffic video information provided in the embodiment of the present invention, image color and brightness information is fully utilized, and the relationship between image frames in the time sequence is considered, and each image clustered group reflects the movement process of a vehicle. The method and the apparatus according to the embodiments of the present invention have strong adaptability to environment changes, and can still achieve stable detection with relatively high precision in severe weathers such as rain, snow and haze.

Each embodiment in this specification is described in a progressive mode, the same or similar parts of the embodiments may refer to each other, and the contents mainly described in each embodiment are all the differences from other embodiments. Particularly, with respect to the embodiment of the system, since it is substantially similar to the embodiment of the method, it is described relatively simply, and for the related parts, please refer to the parts of the description of the embodiment of the method.

Apparently, it should be appreciated by those skilled in the art that the above-mentioned modules or steps of the present invention may be implemented with a general computing device. The modules or steps may be integrated in a single computing device or distributed in a network consisting of a plurality of computing devices. Alternatively, the modules or steps may be implemented by program codes executable by the computing device, thus, the modules or steps may be stored in a storage device and executed by the computing device or made into integrated circuit modules respectively, or a plurality of the modules or steps are made into a single integrated circuit module for implementation. In this way, the present invention is not limited to any specific combination of hardware and software.

The foregoing descriptions are merely preferred embodiments of the present invention, rather than limiting the present invention. For those skilled in the art, the present invention may have various modifications and alterations. Any modification, equivalent substitution, improvement or the like made within the spirit and principle of the present invention shall fall into the protection scope of the present invention.

The invention claimed is:

1. A method for detecting traffic video information, comprising:

acquiring a traffic video stream;

determining color features of each frame of image in the traffic video stream;

calculating inter-frame distance between adjacent frames according to the color features;

calculating boundary of an image clustered frames' group according to the inter-frame distance by adopting an image clustering evaluation standard in RGB space and an image clustering evaluation standard in YUV space respectively; and determining a final boundary of the image clustered frames' group according to boundaries of the image clustered frames' group in RGB space and YUV space, wherein the determining the color features of each frame of image in the traffic video stream comprises:

sampling each frame of image to obtain sampled data;

generating histograms of R, G, B and Y (brightness or luminance) color channels of each frame of image according to the sampled data; and expressing the color features of each frame of image by using four-dimensional histograms as $F=\{H_R^i, H_G^i, H_B^i, H_Y^i\}$, wherein $H_R^i, H_G^i, H_B^i, H_Y^i$, are histograms of four color channels of R, G, B and Y respectively, i=1, 2, . . . , N and N is number of bins of each divided color channel, wherein the calculating the inter-frame distance between the adjacent frames according to the color features comprises:

calculating the inter-frame distance of each color channel between the adjacent frames in RGB space;

finding an intersection of inter-frame distances corresponding to three color channels of R, G and B;

obtaining the inter-frame distance in RGB space by determining the minimal and maximal inter-frame distances of the three color channels of R, G and B respectively; and obtaining the inter-frame distance in YUV space by calculating the inter-frame distance of Y channel between the adjacent frames.

2. The method according to claim 1, wherein the acquiring the traffic video stream comprises:

acquiring the traffic video stream through continuous shooting.

3. The method according to claim 1, wherein further comprising: before generating the histograms of the R, G, B and Y color channels of each frame of image according to the sampled data, de-noising the sampled data.

4. The method according to claim 1, wherein the calculating the boundary of the image clustered frames' group according to the inter-frame distance by adopting the image clustering evaluation standard in RGB space comprises:
  determining the boundary of the image clustered frames' group in RGB space by using the inter-frame distance in RGB space and a preset first target function.

5. The method according to claim 1, wherein the calculating the boundary of the image clustered frames' group according to the inter-frame distance by adopting the image clustering evaluation standard in YUV space comprises:
  determining the boundary of the image clustered frames' group in YUV space by using the inter-frame distance in YUV space and a preset second target function.

6. The method according to claim 5, wherein the determining the final boundary of the image clustered frames' group according to the boundaries of the image clustered frames' group in RGB space and YUV space comprises:
  finding an intersection of the boundary of the image clustered frames' group in RGB space and the boundary of the image clustered frames' group in YUV space to obtain the final boundary of the image clustered frames' group.

7. An apparatus for detecting traffic video information, comprising a processor and a memory with program codes stored thereon, and the program codes are executed by the processor to implement:
  acquiring a traffic video stream;
  determining color features of each frame of image in the traffic video stream;
  determining inter-frame distance between adjacent frames according to the color features;
  calculating boundary of an image clustered frames' group according to the inter-frame distance by adopting an image clustering evaluation standard in RGB space and an image clustering evaluation standard in YUV space respectively; and
  determining a final boundary of the image clustered frames' group according to boundaries of the image clustered frames' group in RGB space and YUV space,
wherein the program codes are executed by the processor to implement:
sampling each frame of image to obtain sampled data;
generating histograms of R, G, B and Y color channels of each frame of image according to the sampled data; and
expressing the color features of each frame of image using four-dimensional histograms as $F=\{H_R^i, H_G^i, H_B^i, H_Y^i\}$, wherein $H_R^i, H_G^i, H_B^i, H_Y^i$, are histograms of four color channels of R, G, B and Y respectively, $i=1,2,\ldots,N$ and N is number of bins of each divided color channel,
wherein the program codes are executed by the processor to implement:
calculating the inter-frame distance of each color channel between the adjacent frames in RGB space;
finding an intersection of inter-frame distances corresponding to three color channels of R, G and B;
determining the minimal and maximal inter-frame distances of the three color channels of R, G and B respectively to obtain the inter-frame distance in RGB space; and
calculating the inter-frame distance of Y color channel between the adjacent frames in YUV space to obtain the inter-frame distance in YUV space.

8. The apparatus according to claim 7, wherein the program codes are executed by the processor to implement:
  de-noising the sampled data before the histograms of the R, G, B and Y color channels of each frame of image are generated according to the sampled data.

9. The apparatus according to claim 7, wherein the program codes are executed by the processor to implement:
  finding an intersection of the boundary of the image clustered frames' group in RGB space and the boundary of the image clustered frames' group in YUV space to obtain the final boundary of the image clustered frames' group.

* * * * *